US011824951B2

(12) United States Patent
Rakshit et al.

(10) Patent No.: US 11,824,951 B2
(45) Date of Patent: Nov. 21, 2023

(54) IOT DEVICE BASED HABIT WORKFLOW MANAGEMENT

(71) Applicant: International Business Machines Corporation, Armonk, NY (US)

(72) Inventors: Sarbajit K. Rakshit, Kolkata (IN); Craig M. Trim, Ventura (CA); James E. Bostick, Cedar Park, TX (US); Martin G. Keen, Cary, NC (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/555,016

(22) Filed: Dec. 17, 2021

(65) Prior Publication Data
US 2023/0199081 A1 Jun. 22, 2023

(51) Int. Cl.
*H04L 67/50* (2022.01)
*H04L 67/12* (2022.01)
*H04L 67/306* (2022.01)
*G16Y 40/10* (2020.01)
*G16Y 20/40* (2020.01)

(52) U.S. Cl.
CPC ............ *H04L 67/535* (2022.05); *G16Y 20/40* (2020.01); *G16Y 40/10* (2020.01); *H04L 67/12* (2013.01); *H04L 67/306* (2013.01)

(58) Field of Classification Search
CPC ..... H04L 67/535; H04L 67/12; H04L 67/306; G16Y 40/10; G16Y 20/40
See application file for complete search history.

(56) References Cited

U.S. PATENT DOCUMENTS

| 8,498,870 | B2 | 7/2013 | Brandt |
| 11,056,238 | B1 | 7/2021 | Nakajima et al. |
| 11,081,238 | B2 | 8/2021 | Damani et al. |
| 2014/0118120 | A1 | 5/2014 | Chen et al. |
| 2016/0195859 | A1* | 7/2016 | Britt ........................ H04W 4/80 700/275 |
| 2016/0300467 | A1 | 10/2016 | Warren et al. |
| 2017/0304682 | A1 | 10/2017 | Zhang et al. |
| 2018/0287812 | A1* | 10/2018 | Lin ........................ H04L 12/282 |
| 2021/0027759 | A1* | 1/2021 | Ogawa .................... G16H 20/60 |
| 2021/0202067 | A1* | 7/2021 | Williams .............. A61B 5/0022 |

* cited by examiner

*Primary Examiner* — Normin Abedin
(74) *Attorney, Agent, or Firm* — Garg Law Firm, PLLC; Rakesh Garg; Michael O'Keefe

(57) ABSTRACT

By monitoring an in-person interaction using a first Internet of Things (IoT) device, an entity relationship between parties in the in-person interaction is identified. Using data resulting from the monitoring, a habit workflow corresponding to the entity relationship is generated, wherein the habit workflow comprises a sequence of habits and a habit in the sequence of habits comprises performance of a behavior. A second IoT device able to monitor execution of the habit workflow is identified. Using the second IoT device, execution of the habit workflow is monitored. A motivational method corresponding to the execution is identified from the monitored execution.

20 Claims, 8 Drawing Sheets

IOT DEVICE BASED HABIT WORKFLOW MANAGEMENT

BACKGROUND

The present invention relates generally to a method, system, and computer program product for habit workflow management. More particularly, the present invention relates to a method, system, and computer program product for IoT device based habit workflow management.

An Internet of Things, or IoT, device is a computer system including a processor, a memory, and a network communications capability that is programmed to perform an application and transmit data over a network such as the internet. Some IoT devices also include one or more sensors, such as a camera, microphone, radio frequency identification (RFID) tag reader, temperature sensor, air quality sensor, or voltage sensor, used to monitor an environment around a device and report sensor data, or report when sensor data departs from a predefined data range.

A habit is a routine of human behavior that is repeated regularly and tends to occur without the habit performer being aware of performing the behavior. Some examples of habits include driving a particular route between home and work and brushing one's teeth before going to bed. Habits can also be assembled into a sequence or workflow. For example, one workflow of bedtime habits might include brushing one's teeth, then washing one's face, and then exchanging day clothes for night clothes.

Habits are generally learned through repetition, and positive or negative reinforcement. Positive reinforcement rewards desired behavior—for example by providing a child who brushes his teeth an extra half hour of video game time. Negative reinforcement disincentivizes undesired behavior—for example by disallowing video gaming for a period of time for a child who does not brush his teeth.

SUMMARY

The illustrative embodiments provide a method, system, and computer program product. An embodiment includes a method that identifies, by monitoring an in-person interaction using a first IoT device, an entity relationship between parties in the in-person interaction. An embodiment generates, using data resulting from the monitoring, a habit workflow corresponding to the entity relationship, wherein the habit workflow comprises a sequence of habits and a habit in the sequence of habits comprises performance of a behavior. An embodiment identifies a second IoT device able to monitor execution of the habit workflow. An embodiment monitors, using the second IoT device, execution of the habit workflow. An embodiment identifies, from the monitored execution, a motivational method corresponding to the execution.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
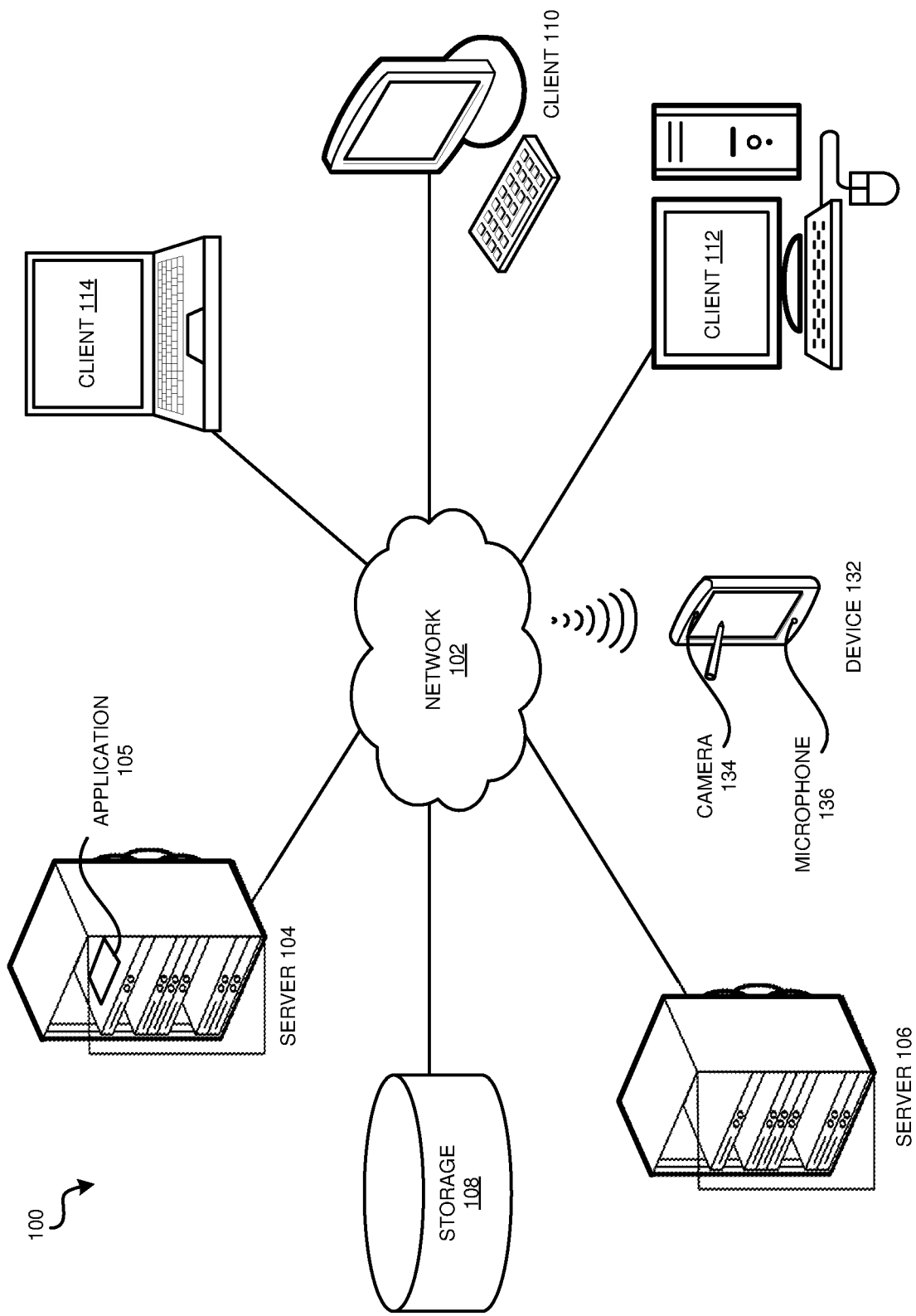
FIG. 1 depicts a block diagram of a network of data processing systems in which illustrative embodiments may be implemented.

The illustrative embodiments recognize that the automatic nature of habits makes instilling desired habits important. For example, habits such as washing one's hands and donning a fresh pair of gloves when moving from one hospital patient to another help prevent hospital-acquired infections. However, the automatic nature of habits also makes documenting compliance with a required habit difficult. For example, when washing one's hands and donning a fresh pair of gloves for each new patient, a written compliance mechanism such as a checklist would be excessively time-consuming.

The illustrative embodiments also recognize that some habits are not documented in written form. Instead, a habit is often taught in one on one or small group interactions between a coach teaching the habit and one or more students learning the habit, then a student practices the habit without documenting his or her actions. However, the habit itself might still require management (e.g. to ensure the correct habits are being performed) and compliance with the habit might still need to be documented (e.g. as part of an incident investigation or compliance certification).

Thus, the illustrative embodiments recognize that there is an unmet need to manage, monitor and document habit compliance, even when the habit itself is not documented.

The illustrative embodiments recognize that the presently available tools or solutions do not address these needs or provide adequate solutions for these needs. The illustrative embodiments used to describe the invention generally address and solve the above-described problems and other problems related to IoT device based habit workflow management.

An embodiment can be implemented as a software application. The application implementing an embodiment can be configured as a modification of an existing IoT device based user monitoring system, as a separate application that operates in conjunction with an existing IoT device based user monitoring system, a standalone application, or some combination thereof.

Particularly, some illustrative embodiments provide a method that monitors an in-person interaction to identify an entity relationship between parties in the interaction, uses data resulting from the monitoring to generate a habit workflow corresponding to the entity relationship, identifies a second IoT device able to monitor execution of the habit workflow, uses the second IoT device to monitor execution of the habit workflow, and identifies a motivational method corresponding to the monitored execution.

In an optional device configuration process, an IoT device usable to monitor an environment is registered with an embodiment. During IoT device registration, an embodiment is provided with data of a device's capabilities and communication methods. IoT device registration also includes granting permission to monitor an environment and configuring any limitations on the monitoring (e.g. locations that are allowed or not allowed to be monitored, hours during which monitoring is allowed, types of monitoring data that are sharable or not sharable with an embodiment, and the like).

In an optional user configuration process, one or more users and their respective roles are registered with an embodiment. During user registration, an embodiment is provided with data of one or users. Some non-limiting examples of user data are the user's name, a sample of the user's voice, permission to monitor a user, limitations on the monitoring (e.g. locations in which the user is allowed or not allowed to be monitored, hours during which monitoring is allowed, and the like), which users can access data of which other users (e.g. whether a manager can access data of her employee), which users are authorized to teach a particular habit or habit type, and the like.

An embodiment uses one or more IoT devices to monitor an in-person interaction. One embodiment uses a microphone in an IoT device to monitor audio of an in-person interaction.

From the monitoring, an embodiment identifies an entity relationship between parties in the interaction. One embodiment uses voice recognition, a presently known technique, to label individual voices within the interaction. One embodiment uses presently known techniques to convert spoken word data to text and identify relationships between speakers. One non-limiting example of an entity relationship is that Voice A is a coach, teaching a habit to Voice B. Another non-limiting example of an entity relationship is that Voice C is a manager of Voice A and Voice B, discussing Voice B's habits with Voice A. Other non-limiting examples of entity relationships are parent-child and teacher-child, for an embodiment implemented in a home or school setting for opt-in use.

An embodiment also uses user data, if available, to match a particular voice with data in a particular user profile. For example, if there is user profile data, including the user's name (e.g. John Smith) and a sample of John Smith's voice, and the sample of John Smith's voice matches data the embodiment identified as Voice A, the embodiment relabels Voice A as John Smith. Another embodiment uses data derived from interaction monitoring to match a particular voice with data in a particular user profile. For example, if Voice B addresses Voice A as Elena, and Voice A answers, the embodiment relabels Voice A as Elena.

An embodiment generates, from the monitoring, a habit workflow corresponding to the entity relationship. One embodiment uses presently known natural language processing techniques and machine learning techniques to convert spoken word data to text, extract one or instructions from one party in an interaction to another, and determine that the instructions, and any sequence in which they are delivered, have been repeated above a threshold amount, with above a threshold consistency, so as to comprise a pattern—the habit workflow.

An embodiment adjusts the habit workflow from data resulting from additional monitoring. For example, the additional monitoring might detect an additional requirement for a habit's performance (e.g. "it's good that you're washing your hands, but you need to continue for at least twenty seconds"), or an insertion, deletion, or sequence change in a previously-generated habit workflow.

An embodiment identifies a device that is configurable to monitor execution of the habit workflow. A device used to monitor execution need not be the same as a device used to monitor the interaction. One embodiment identifies a device with an environment monitoring capability appropriate to the workflow from one or more devices already registered with the embodiment. For example, if a habit in a workflow is to wash one's hands, a registered camera is configurable to provide images of a particular user washing hands at a particular sink, a microphone is configurable to monitor sounds interpretable as washing, an RFID reader is configurable to detect a particular user's employee identification badge within a threshold proximity to a particular location such as a sink, and an activation sensor at a sink is configurable to detect activation of water and soap dispensers. Another embodiment identifies a device with an environment monitoring capability appropriate to the workflow by using a presently known technique to detect a device in a location to be monitored and query the device as to its capabilities and availability for monitoring. For example, an embodiment might detect that, within a hospital, a set of RFID readers are accessible via the hospital's communications network, being used for patient location tracking, and are also usable to detect a location of a particular user's employee identification badge.

An embodiment uses the identified device to monitor execution of the habit workflow. For example, if a habit in a workflow is to wash one's hands, an embodiment might use a camera to collect images of a particular user washing hands at a particular sink and use a presently known image processing technique to interpret the images. Similarly, an embodiment might use a microphone is configurable to monitor sounds, and use a presently known sound interpretation technique to interpret the sounds as washing. As well, an embodiment might use an RFID reader to detect a particular user's employee identification badge within a threshold proximity to a particular location such as a sink and use one or more activation sensors at the same sink to detect activation of water and soap dispensers while the user is at the sink. And an embodiment might use a time associated with one or more other detected activities to determine that each habit in a workflow is performed in the correct sequence. An embodiment reports a result of the monitoring, for example to a manager for compliance certification, or to the student or coach to implement a workflow adjustment or feedback regarding the student's performance.

An embodiment uses data from interaction monitoring to identify a motivational method or coaching style used during the interaction to teach the workflow. One embodiment uses presently known natural language processing techniques and machine learning or pattern matching techniques to convert spoken word data to text and match the text, within a threshold amount, to one of a set of known motivational method patterns or coaching style patterns. One embodiment uses two motivational method patterns, positive and negative. One non-limiting example of a positive motivational method is a coach reminding a student that there is a weekly bonus for one hundred percent compliance with an infection prevention protocol. One non-limiting example of a negative motivational method is a coach reminding a student that there is a weekly fine assessed on any employee who is not in one hundred percent compliance with an infection prevention protocol.

An embodiment uses data from workflow monitoring to identify a level of success, or relative success, of the identified motivational method. Some students learn better in response to positive motivation, a particular type of positive motivational method, or a particular coaching style, while other students learn better in response to negative motivation, a particular type of negative motivational method, or another coaching style. Thus, if a student, when coached using one motivational method or style, does not perform the workflow at all, but when coached using a second, method does perform the workflow, an embodiment concludes that the second method is more successful than the first method for this student. Similarly, if a student learns a workflow faster when coached with one style versus another style, an embodiment concludes that the style that resulting in faster learning is the more successful style for this student. An embodiment reports the success of a particular motivational method or coaching style to a user such as a coach or manager, as feedback with which the coach can improve his or her coaching of this student. Another embodiment suggests a motivational method or coaching style, based on the level of success, or relative success, of an identified motivational method. For example, an embodiment might suggest repeating a successful motivational method, or switching from an unsuccessful motivational method to another method.

An embodiment also uses data from workflow monitoring to identify a portion of the workflow needing improvement. An embodiment reports the identify a portion of the workflow needing improvement to a user such as the student, or a coach or manager, as feedback regarding workflow or coaching performance.

The manner of IoT device based habit workflow management described herein is unavailable in the presently available methods in the technological field of endeavor pertaining to IoT device based user monitoring. A method of an embodiment described herein, when implemented to execute on a device or data processing system, comprises substantial advancement of the functionality of that device or data processing system in monitoring an in-person interaction to identify an entity relationship between parties in the interaction, using data resulting from the monitoring to generate a habit workflow corresponding to the entity relationship, identifying a second IoT device able to monitor execution of the habit workflow, using the second IoT device to monitor execution of the habit workflow, and identifying a motivational method corresponding to the monitored execution.

The illustrative embodiments are described with respect to certain types of habits, habit workflows, motivational methods, coaching styles, interactions, thresholds, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
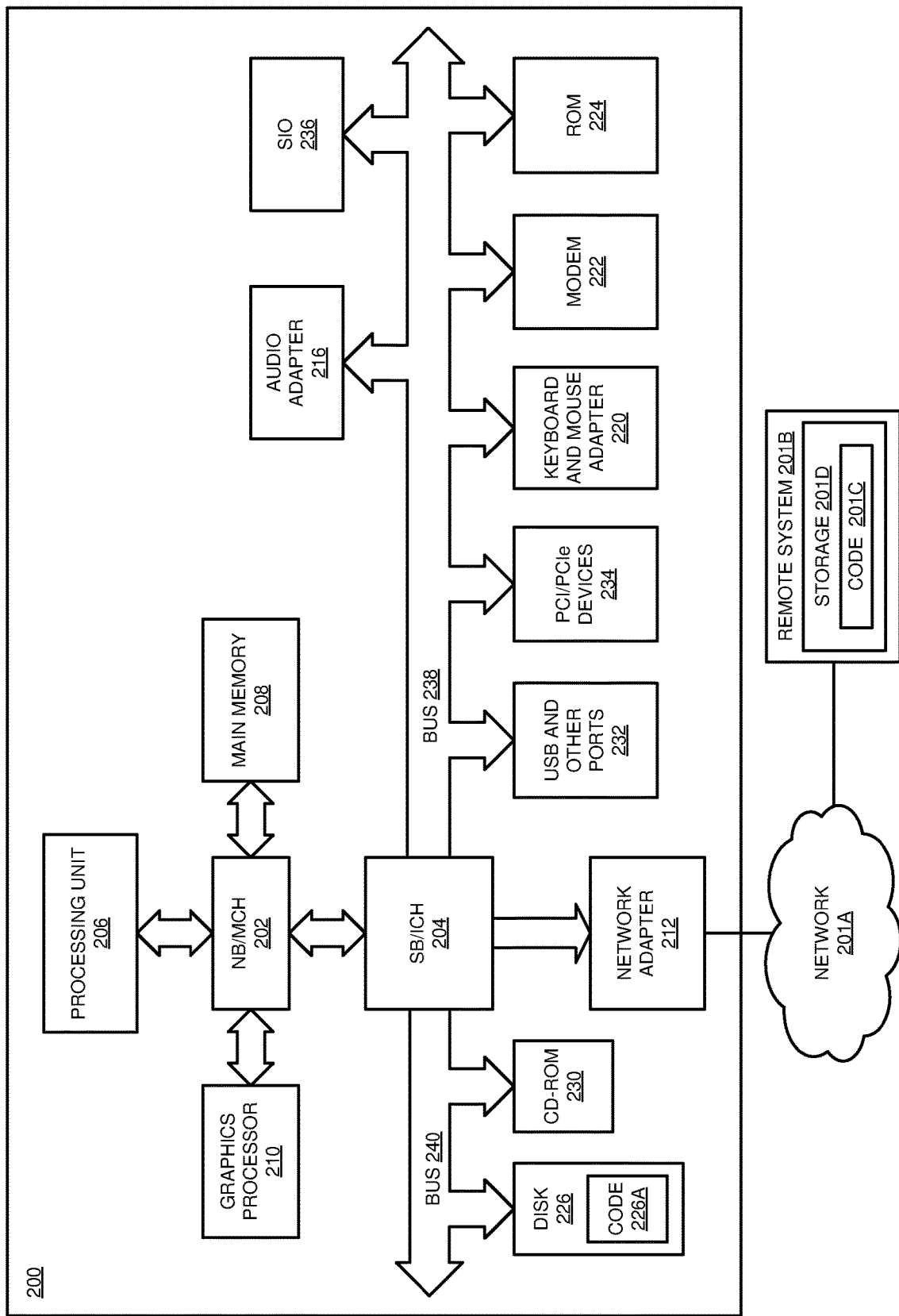
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, an IoT device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes camera 134 and microphone 136.

Application 105 implements an embodiment described herein. Application 105 executes in any of servers 104 and 106, clients 110, 112, and 114, and device 132. For example, when implemented in device 132, application 105 uses camera 134 and microphone 136 to monitor an environment.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
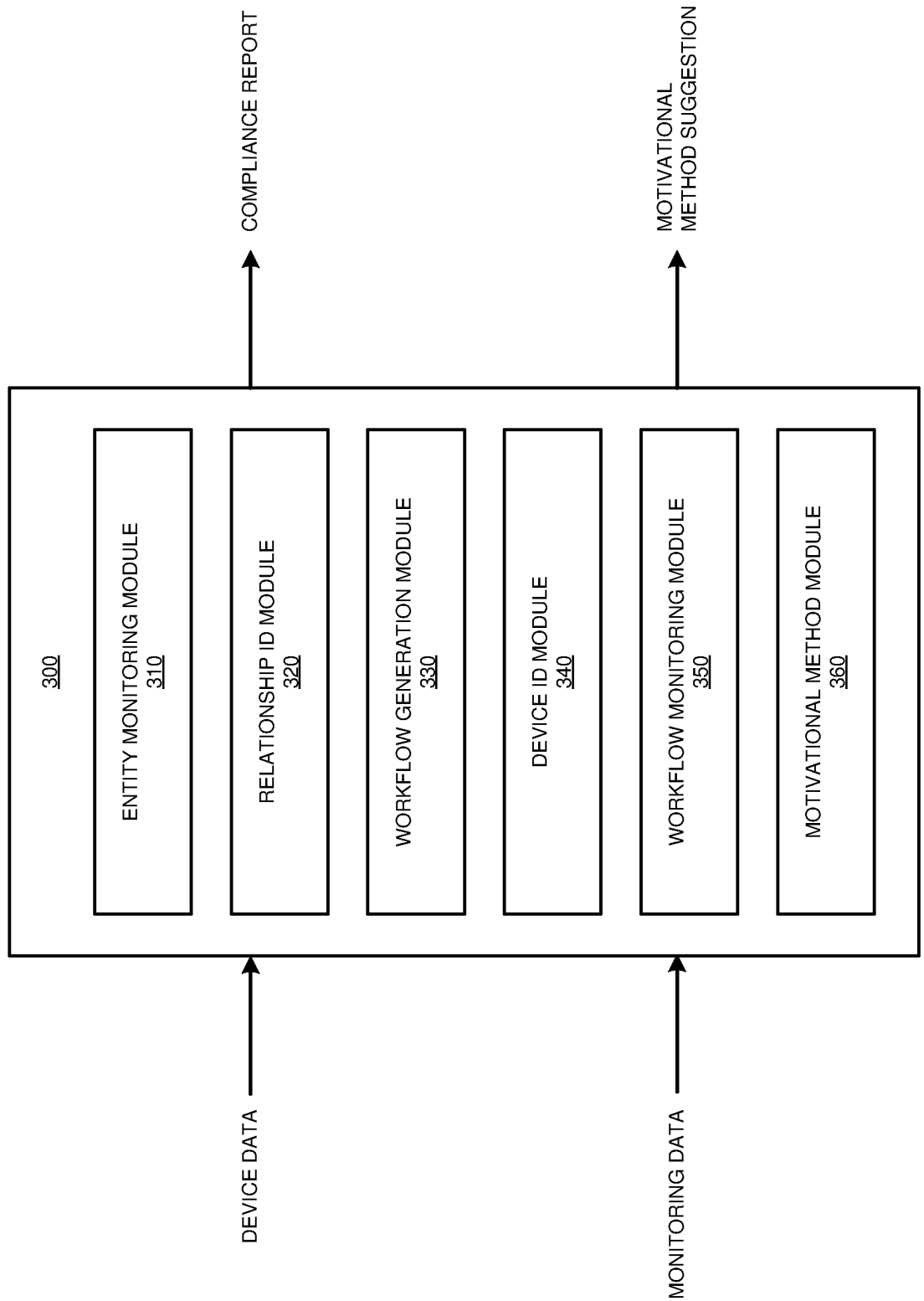
FIG. 3 depicts a block diagram of an example configuration for IoT device based habit workflow management in accordance with an illustrative embodiment.

With reference to FIG. 3, this figure depicts a block diagram of an example configuration for IoT device based habit workflow management in accordance with an illustrative embodiment. Application 300 is an example of application 105 in FIG. 1 and executes in any of servers 104 and 106, clients 110, 112, and 114, and device 132 in FIG. 1.

In an optional device configuration process, an IoT device usable to monitor an environment is registered with application 300. During IoT device registration, application 300 is provided with data of a device's capabilities and communication methods. IoT device registration also includes granting permission to monitor an environment and configuring any limitations on the monitoring. In an optional user configuration process, one or more users and their respective roles are registered with application 300. During user registration, application 300 is provided with data of one or users.

Entity monitoring module 310 uses one or more IoT devices to monitor an in-person interaction. One implementation of module 310 uses a microphone in an IoT device to monitor audio of an in-person interaction.

From the monitoring, relationship identification module 320 identifies an entity relationship between parties in the interaction. One implementation of module 320 uses voice recognition to label individual voices within the interaction. One implementation of module 320 uses presently known techniques to convert spoken word data to text and identify relationships between speakers. Some non-limiting examples of an entity relationship are a coach student, manager-employee, parent-child and teacher-child. Module 320 also uses user data, if available, to match a particular voice with data in a particular user profile. Module 320 also uses data derived from interaction monitoring to match a particular voice with data in a particular user profile.

Workflow generation module 330 generates, from the monitoring, a habit workflow corresponding to the entity relationship. One implementation of module 330 uses presently known natural language processing techniques and machine learning techniques to convert spoken word data to text, extract one or instructions from one party in an interaction to another, and determine that the instructions, and any sequence in which they are delivered, have been repeated above a threshold amount, with above a threshold consistency, so as to comprise a pattern—the habit workflow. Module 330 also adjusts the habit workflow from data resulting from additional monitoring. For example, the additional monitoring might detect an additional requirement for a habit's performance, or an insertion, deletion, or sequence change in a previously-generated habit workflow.

Device identification module 340 identifies a device that is configurable to monitor execution of the habit workflow. A device used to monitor execution need not be the same as a device used to monitor the interaction. One implementation of module 340 identifies a device with an environment monitoring capability appropriate to the workflow from one or more already registered devices. Another implementation of module 340 identifies a device with an environment monitoring capability appropriate to the workflow by using a presently known technique to detect a device in a location to be monitored and query the device as to its capabilities and availability for monitoring.

Workflow monitoring module 350 uses the identified device to monitor execution of the habit workflow. For example, if a habit in a workflow is to wash one's hands, module 350 might use a camera to collect images of a particular user washing hands at a particular sink and use a presently known image processing technique to interpret the images. Similarly, module 350 might use a microphone is configurable to monitor sounds, and use a presently known sound interpretation technique to interpret the sounds as washing. As well, module 350 might use an RFID reader to detect a particular user's employee identification badge within a threshold proximity to a particular location such as a sink and use one or more activation sensors at the same sink to detect activation of water and soap dispensers while the user is at the sink. And module 350 might use a time associated with one or more other detected activities to determine that each habit in a workflow is performed in the correct sequence. Module 350 reports a result of the monitoring, for example to a manager for compliance certification, or to the student or coach to implement a workflow adjustment or feedback regarding the student's performance.

Motivational method module 360 uses data from interaction monitoring to identify a motivational method or coaching style used during the interaction to teach the workflow. One implementation of module 360 uses presently known natural language processing techniques and machine learning or pattern matching techniques to convert spoken word data to text and match the text, within a threshold amount, to one of a set of known motivational method patterns or coaching style patterns. One implementation of module 360 uses two motivational method patterns, positive and negative. Module 360 uses data from workflow monitoring to identify a level of success, or relative success, of the identified motivational method. Module 360 reports the success of a particular motivational method or coaching style to a user such as a coach or manager, as feedback with which the coach can improve his or her coaching of this student.

Module 350 also uses data from workflow monitoring to identify a portion of the workflow needing improvement. Module 350 reports the identify a portion of the workflow needing improvement to a user such as the student, or a coach or manager, as feedback regarding workflow or coaching performance.

Figure 4:
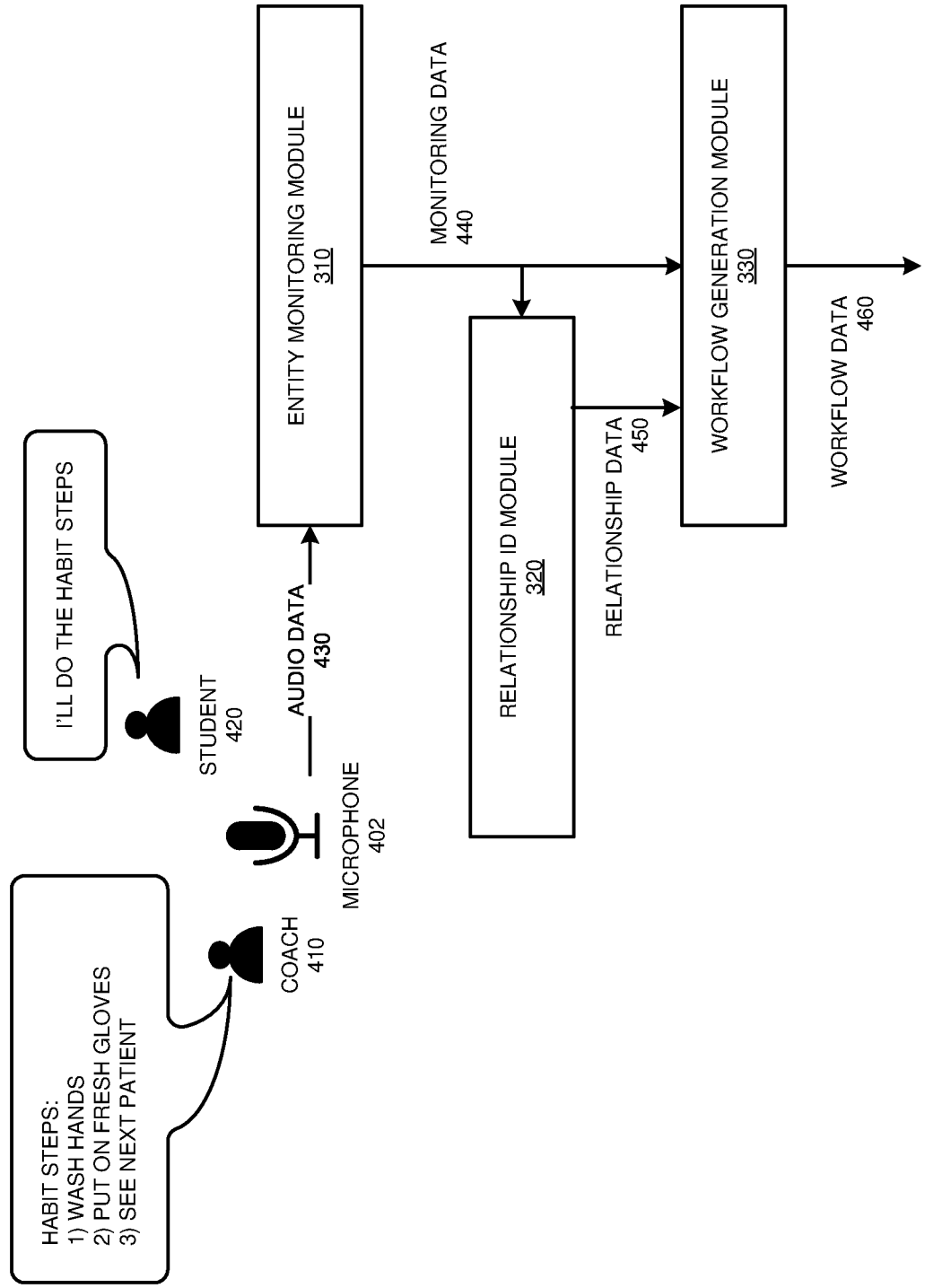
FIG. 4 depicts an example of IoT device based habit workflow management in accordance with an illustrative embodiment.

With reference to FIG. 4, this figure depicts an example of IoT device based habit workflow management in accordance with an illustrative embodiment. The application can be executed using application 300 in FIG. 1. Entity monitoring module 310, relationship identification module 320, and workflow generation module 330 are the same as entity monitoring module 310, relationship identification module 320, and workflow generation module 330 in FIG. 3.

As depicted, microphone 402 is used to monitor an in-person interaction between coach 410 and student 420. Microphone 402 provides audio data 430 to entity monitoring module 310, which produces monitoring data 440. Relationship identification module 320 uses monitoring data 440 to identify an entity relationship between parties in the interaction, producing relationship data 450. Workflow generation module 330 uses monitoring data 440 and relationship data 450 to generate workflow data 460, a habit workflow.

Figure 5:
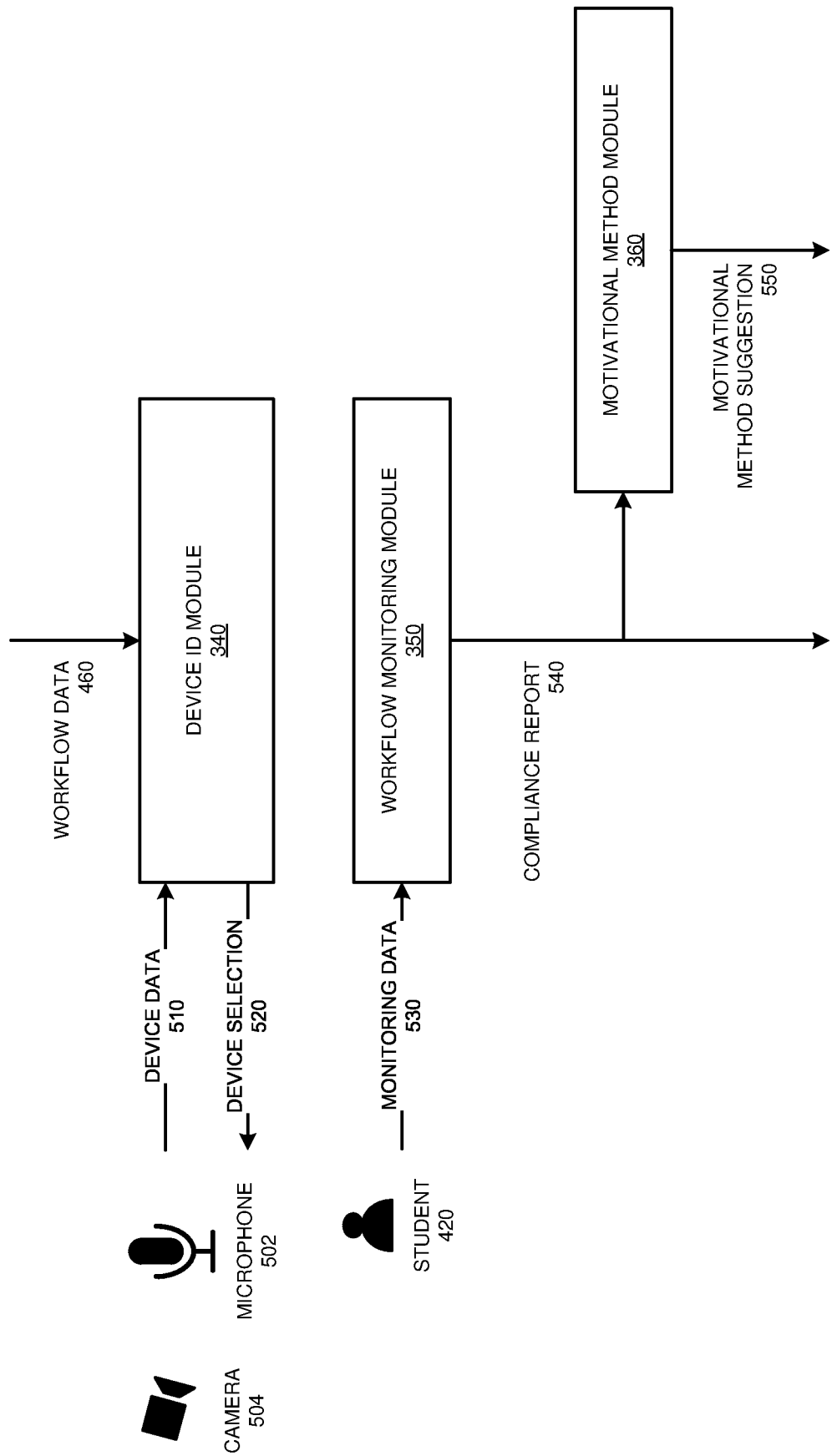
FIG. 5 depicts a continued example of IoT device based habit workflow management in accordance with an illustrative embodiment.

With reference to FIG. 5, this figure depicts a continued example of IoT device based habit workflow management in accordance with an illustrative embodiment. The application can be executed using application 300 in FIG. 1. Device identification module 340, workflow monitoring module 350, and motivational method module 360 are the same as device identification module 340, workflow monitoring module 350, and motivational method module 360 in FIG. 3. Student 420 and workflow data 460 are the same as student 420 and workflow data 460 in FIG. 4.

As depicted, device identification module 340 receives workflow data 460. Module 340 using a presently known technique to detect a device in a location to be monitored and query the device as to its capabilities and availability for monitoring. Camera 504 and microphone 502 respond to a query by providing device data 510 to module 340, and module 340 responds with device selection 520, selecting both camera 504 and microphone 502. Workflow monitoring module 350 uses camera 504 and microphone 502 to monitor execution of the habitat workflow in workflow data 460, producing compliance report 540. Motivational method module 360 uses compliance report 540 to report the success of a particular motivational method or coaching style to a user such as a coach or manager, and identifies motivational method suggestion 550 accordingly.

Figure 6:
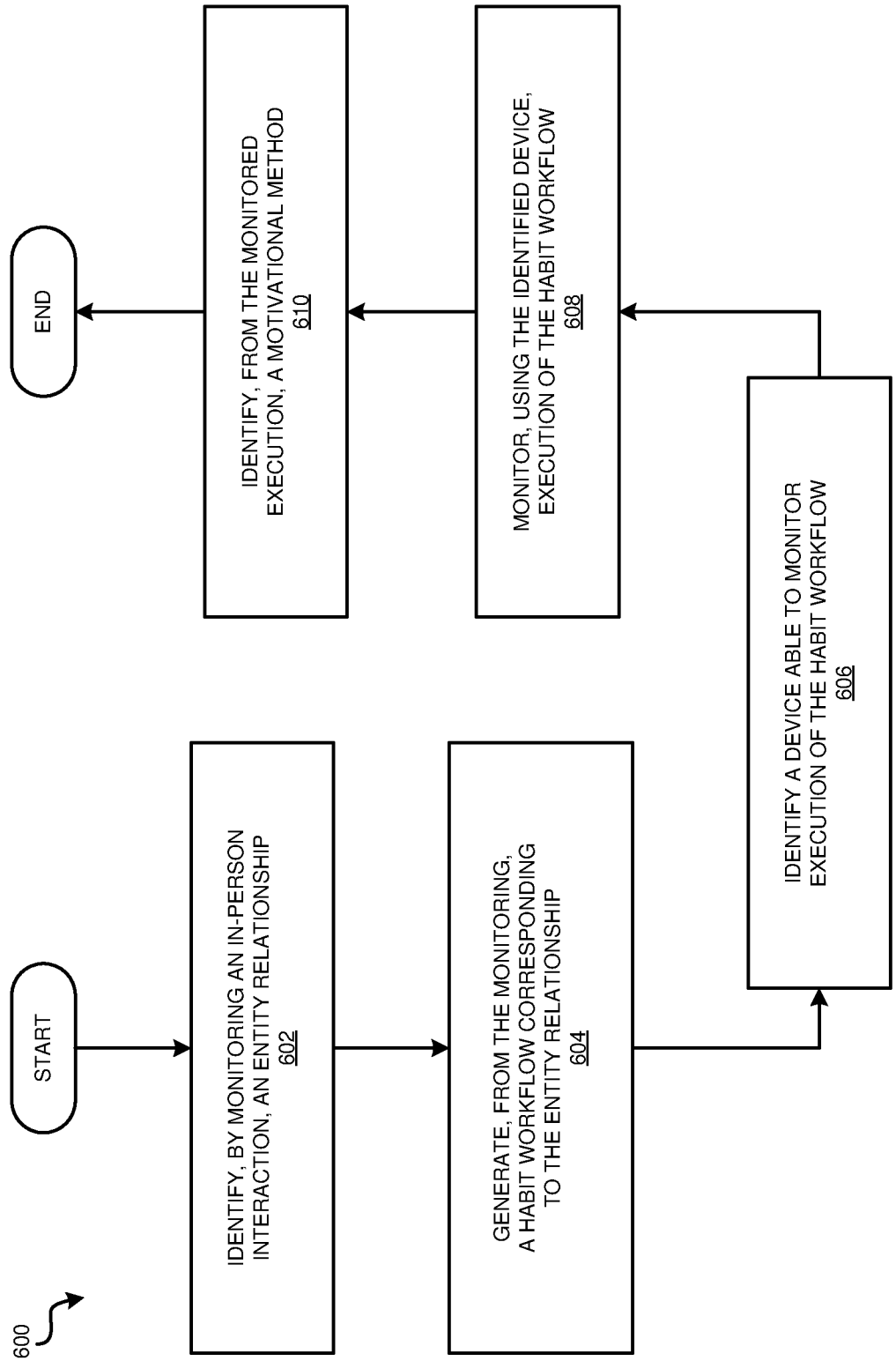
FIG. 6 depicts a flowchart of an example process for IoT device based habit workflow management in accordance with an illustrative embodiment.

With reference to FIG. 6, this figure depicts a flowchart of an example process for IoT device based habit workflow management in accordance with an illustrative embodiment. Process 600 can be implemented in application 300 in FIG. 3.

In block 602, the application identifies, by monitoring an in-person interaction, an entity relationship. In block 604, the application generates, from the monitoring, a habit workflow corresponding to the entity relationship. In block 606, the application identifies a device able to monitor execution of the habit workflow. In block 608, the application monitors, using the identified device, execution of the habit workflow. In block 610, the application identifies, from the monitored execution, a motivational method. Then the application ends.

Figure 7:
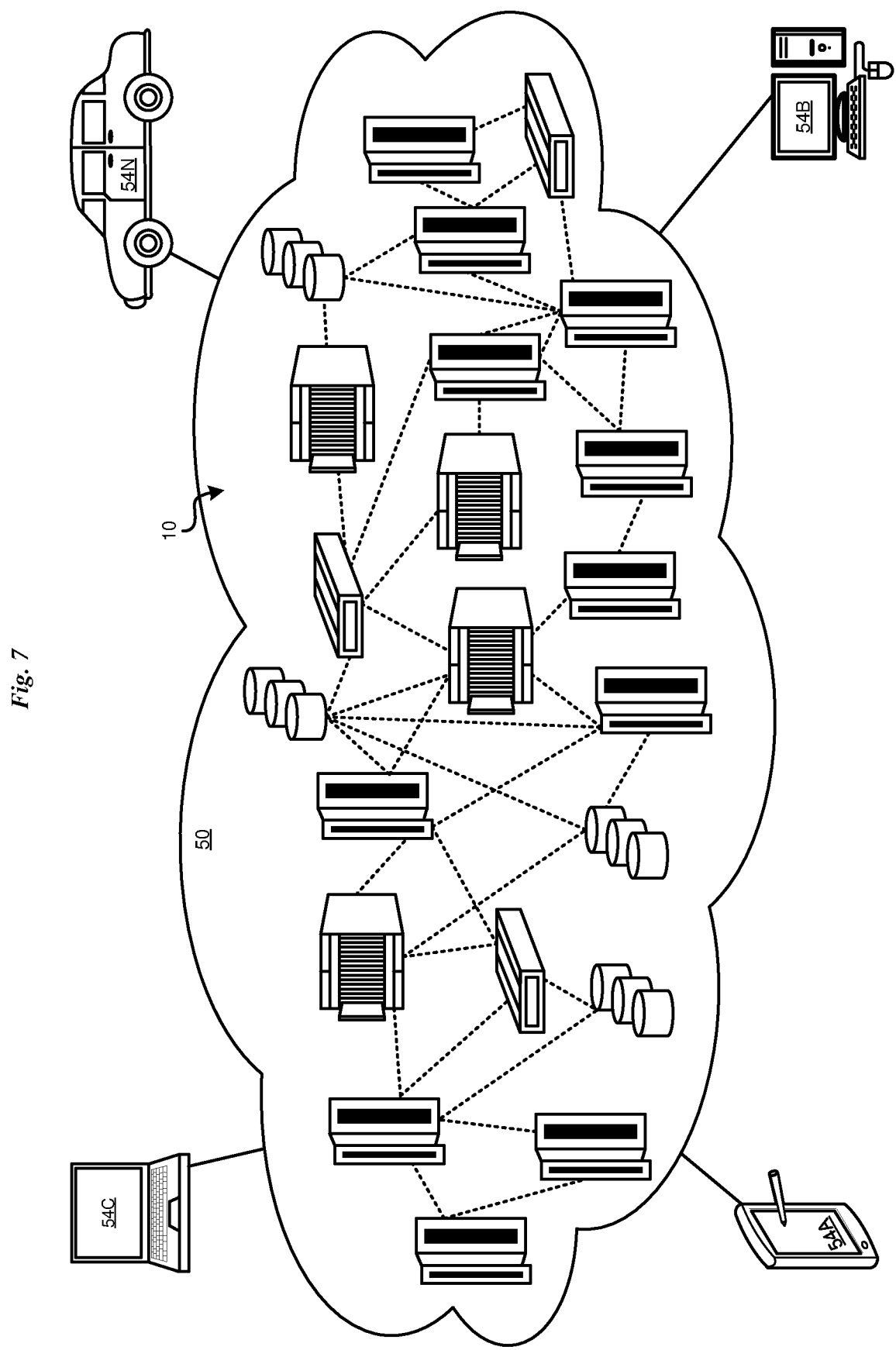
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
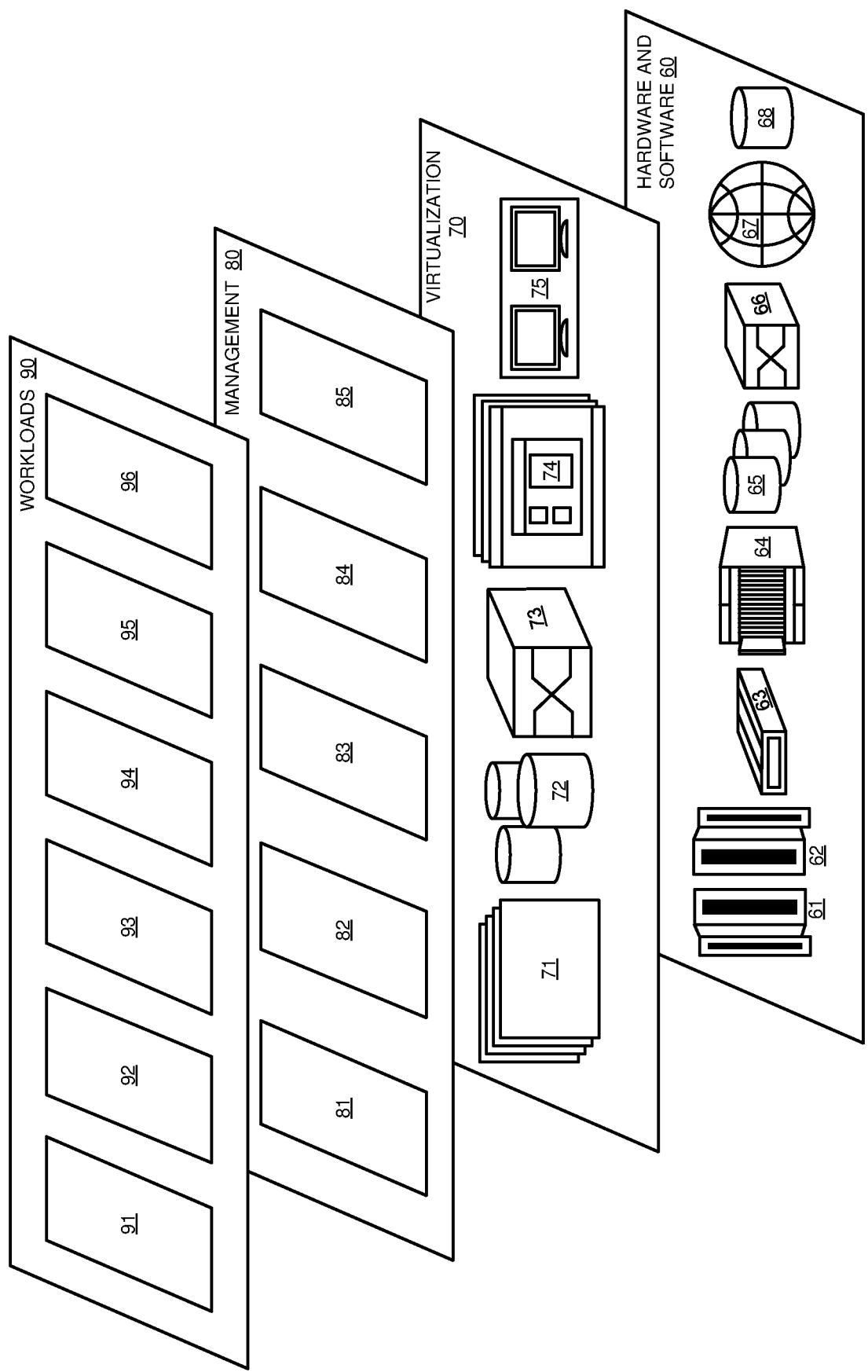
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for IoT device based habit workflow management and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying, by monitoring an in-person interaction using a first Internet of Things (IoT) device, a teacher role and a student role within the in-person interaction, the teacher role performed by a first human party and the student role performed by a second human party in the in-person interaction;
    generating, using data resulting from the monitoring, a habit workflow corresponding to the teacher role and the student role, wherein the habit workflow comprises a sequence of habits and a habit in the sequence of habits comprises performance of a behavior;
    identifying a second IoT device able to monitor execution of the habit workflow;
    monitoring, using the second IoT device, execution of the habit workflow; and
    outputting a feedback comprising a motivational method, an implementation of the motivational method resulting in adjusting of the habit workflow, the motivational method comprising at least one from a group comprising a positive motivational method and a negative motivational method.

2. The computer-implemented method of claim 1, further comprising:
    registering an IoT device usable to monitor execution of the habit workflow.

3. The computer-implemented method of claim 1, further comprising:
    matching, using data resulting from the monitoring, a party in the in-person interaction with user profile data.

4. The computer-implemented method of claim 1, further comprising:
    adjusting, using second data resulting from monitoring a second in-person interaction using the first IoT device, the habit workflow.

5. The computer-implemented method of claim 4, wherein the adjusting comprises adding a performance specification of the habit.

6. The computer-implemented method of claim 4, wherein the adjusting comprises altering the sequence of habits of the habit workflow.

7. A computer program product for device based habit workflow management, the computer program product comprising:
    one or more computer readable storage media, and program instructions collectively stored on the one or more computer readable storage media, the stored program instructions comprising:
        program instructions to identify, by monitoring an in-person interaction using a first Internet of Things (IoT) device, a teacher role and a student role within the in-person interaction, the teacher role performed by a first human party and the student role performed by a second human party in the in-person interaction;
        program instructions to generate, using data resulting from the monitoring, a habit workflow corresponding to the teacher role and the student role, wherein the habit workflow comprises a sequence of habits and a habit in the sequence of habits comprises performance of a behavior;
        program instructions to identify a second IoT device able to monitor execution of the habit workflow;
        program instructions to monitor, using the second IoT device, execution of the habit workflow; and
        program instructions to output a feedback comprising a motivational method, an implementation of the motivational method resulting in adjusting of the habit workflow, the motivational method comprising at least one from a group comprising a positive motivational method and a negative motivational method.

8. The computer program product of claim 7, the stored program instructions further comprising:
    program instructions to register an IoT device usable to monitor execution of the habit workflow.

9. The computer program product of claim 7, the stored program instructions further comprising:
    program instructions to match, using data resulting from the monitoring, a party in the in-person interaction with user profile data.

10. The computer program product of claim 7, the stored program instructions further comprising:
    program instructions to adjust, using second data resulting from monitoring a second in-person interaction using the first IoT device, the habit workflow.

11. The computer program product of claim 10, wherein the adjusting comprises adding a performance specification of the habit.

12. The computer program product of claim 10, wherein the adjusting comprises altering the sequence of habits of the habit workflow.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
   program instructions to identify, by monitoring an in-person interaction using a first Internet of Things (IoT) device, a teacher role and a student role within the in-person interaction, the teacher role performed by a first human party and the student role performed by a second human party in the in-person interaction;
   program instructions to generate, using data resulting from the monitoring, a habit workflow corresponding to the teacher role and the student role, wherein the habit workflow comprises a sequence of habits and a habit in the sequence of habits comprises performance of a behavior;
   program instructions to identify a second IoT device able to monitor execution of the habit workflow;
   program instructions to monitor, using the second IoT device, execution of the habit workflow; and
   program instructions to output a feedback comprising a motivational method, an implementation of the motivational method resulting in adjusting of the habit workflow, the motivational method comprising at least one from a group comprising a positive motivational method and a negative motivational method.

17. The computer system of claim 16, the stored program instructions further comprising:
   program instructions to register an IoT device usable to monitor execution of the habit workflow.

18. The computer system of claim 16, the stored program instructions further comprising:
   program instructions to match, using data resulting from the monitoring, a party in the in-person interaction with user profile data.

19. The computer system of claim 16, the stored program instructions further comprising:
   program instructions to adjust, using second data resulting from monitoring a second in-person interaction using the first IoT device, the habit workflow.

20. The computer system of claim 19, wherein the adjusting comprises adding a performance specification of the habit.

* * * * *